United States Patent [19]

Kamimura et al.

[11] Patent Number: 5,235,156

[45] Date of Patent: Aug. 10, 1993

[54] METHOD AND APPARATUS FOR SURFACE MODIFICATION OF METAL PARTS

[75] Inventors: Tadashi Kamimura, Yokohama; Akira Tsujimura, Chigasaki, both of Japan

[73] Assignee: Isuzu Motors Limited, Tokyo, Japan

[21] Appl. No.: 692,335

[22] Filed: Apr. 26, 1991

[30] Foreign Application Priority Data

Apr. 27, 1990 [JP] Japan ................................ 2-114765

[51] Int. Cl.$^5$ ............................................ B23K 9/095
[52] U.S. Cl. ............................ 219/130.21; 219/137 PS
[58] Field of Search ................ 219/130.21, 137 PS, 219/130.32, 130.31, 137 R

[56] References Cited

U.S. PATENT DOCUMENTS 4,291,220  9/1981  Lessmann et al. ............... 219/137 R
5,136,139  8/1992  Gilliland ........................ 219/137 PS

FOREIGN PATENT DOCUMENTS 58-187262  11/1983  Japan ............................ 219/130.21
59-120368   7/1984  Japan .
60-99480    6/1985  Japan .
62-6798     1/1987  Japan .
1181995     2/1970  United Kingdom .

OTHER PUBLICATIONS

Ryabov et al., "Local Hardening of Components of Aluminium Alloys", *Welding International*, 1988, pp. 510–533.

Primary Examiner—Clifford C. Shaw
Attorney, Agent, or Firm—Dykema Gossett

[57] ABSTRACT

A method of modifying surfaces of metal parts comprises melting an area of metal surface by high-density energy irradiation, sensing the temperature (t) of the melted area, and of carrying out the build-up welding by using a wire (8) containing a heat-resistant alloying element (25).

16 Claims, 4 Drawing Sheets

METHOD AND APPARATUS FOR SURFACE MODIFICATION OF METAL PARTS

BACKGROUND OF THE INVENTION

1. Technical Field

This invention relates to a method and apparatus for modifying surfaces of metal parts by means of high-density energy and build-up welding.

2. Background Art

The parts of aluminum castings that are subject partially to a large thermal and/or mechanical load, such as cylinder heads of internal combustion engines, require modification of their surfaces (reinforcement of surfaces). To satisfy such requirement there have been recently proposed different methods of surface remelting treatment or alloy remelting treatment (addition of heat-resistant elements) by means of high-density energy irradiation such as irradiation of laser beams, electron beams, tungusten inert-gas (TIG) arcs, or metal inert-gas (MIG) arcs.

Features of these proposed methods, which relate to the high-density energy to be used, include capability of deepening the alloyed layer (by laser and electron beams). direct alloying of the casting surface (by laser and electron beams, and TIG arcs) and high speed welding.

However, these methods of high-density energy irradiation have such disadvantages as high price of equipment (laser beams), long treatment time, necessity of in-vacuum treatment (electron beams) and the deleterious effect of porosity defects of the base metal which is liable to cause blow holes (TIG and MIG arcs).

In consideration of the above-mentioned disadvantages it is desired to use, as a method of surface modification of low cost and high productivity, alloying of base metals (build-up welding) by TIG arc welding or MIG arc welding. However, these methods involve also the problem that the quantity of alloying elements which can be added to the base metal surface layer is limited to a low level (TIG arc welding), and that the casting surface cannot be subjected to direct alloy welding but requires preliminary machining (MIG welding).

SUMMARY OF THE INVENTION

An object of the present invention is to modify the surfaces of metal parts by offering large heat resistance to the surface layer of the metal parts.

Another object of the present invention is to realize a method and apparatus of surface modification of low cost and high productivity.

A further purpose of the present invention is to achieve a method and apparatus which do not require machining prior to the surface modification.

A still further object is to increase the quantity of heat-resistant alloying elements to secure the significant improvement of heat resistance of the metal parts.

Another object is to effect build-up welding for the surface modification without welding defects to secure the significant improvement of heat resistance of the metal parts.

The method of the present invention for modifying surfaces of metal parts includes a step of melting the surface layer to be modified by high-density energy irradiation, a step of sensing the temperature of the area melted at the preceding step, and a step of performing the build-up welding under the welding condition based on the sensed temperature by using a wire that contains heat-resistant alloying elements.

A method of the present invention for modifying surfaces of metal parts includes a step of melting the surface layer to be modified by high-density energy irradiation, a step of sensing the temperature of the area melted at the preceding step, a step of determining the welding condition on the basis of the sensed temperature, and a step of performing the build-up welding under the welding condition determined at the preceding step by using a wire which contains heat-resistant alloying elements.

Furthermore a method of the present invention for modifying surfaces of metal parts includes a step of melting the surface layer to be modified by high-density energy irradiation, a step of sensing the temperature of the area melted at the preceding step, a step of selecting, on the basis of the sensed temperature, a welding current value for the desired penetration depth from the beforehand prepared map of welding conditions that shows the relationship between the melting temperature by thermal inertia and the penetration depth at different current values in an appropriate range, a step of performing the build-up welding at the thus selected current value by using a wire which contains heat-resistant alloying elements, and a step of reducing the current value when the temperature has exceeded the high limit of the desired penetration depth.

An apparatus of the present invention for modifying surfaces of metal parts is provided with means of high-energy irradiation for melting the area of a part to be modified, a MIG welding machine to perform the build-up welding of the melted area by using a wire which contains heat-resistant alloying elements, and means that senses the temperature of the area after the melting to determine welding conditions of the MIG welding machine.

An apparatus of the present invention for modifying surfaces of metal parts is provided with means of high-energy irradiation for melting the area of a part to be modified, a MIG welding machine to perform the build-up welding of the melted area by using a wire which contains heat-resistant alloying elements, means that senses the temperature of the area after the melting to determine welding conditions of the MIG welding machine, and a welding controller that determines, on the basis of the sensed temperature, the welding conditions of the MIG welding machine and which controls the operation of the welding machine for carrying out the build-up welding under such determined conditions.

The MIG welding machine is desired to be installed in a backward position of the means of the high-density energy irradiation with a predetermined space between them.

It is perferable for the means of high-density energy irradiation to be a torch for the TIG arc welding.

It is also preferable that the temperature sensing means is provided with a movable thermocouple that is in contact with the area after melting and generates a thermoelectromotive force corresponding to the temperature of the melted area, and an instrument for measuring the thermoelectromotive force as temperature information of the thermal inertia via an amplifier connected to the movable thermocouple.

It is also preferable that the movable thermocouple is provided with a roller on the external circumference of which contact members are wound and which rolls over the melted area, a couple of metal wires which can generate a thermoelectromotive force, and contact holders between which the roller is held so that the wires can confront each other via the contact members.

It is preferable for the roller to be pivoted to turn freely on the tips of rods suspended on the rear side of the means of the energy irradiation.

It is preferable that the holders have contact terminals embedded with tip parts of the metal wires.

It is also preferable that the contact holders have tension springs to maintain the contact terminals in contact with the external circumference of the roller.

It is further preferable that the wires are composed of small capsules which contain nucleus particles of heatresistant alloying elements coated with metal particles and a sheath which is filled with the small capsules.

It is preferable for the metal particles to be of a metal compatible with the part to be modified.

It is preferable for the sheath to be of a metal compatible with the part to be modified.

The nucleus particles of heat-resistant alloying elements may be heat-resistant metal particles of Cr, Co, Mo, etc. or ceramic particles of $Al_2O_3$, SiC, $Si_3N_4$, CuO, etc.

It is preferable for the roller that at least the circumferential surface of the roller is of a ceramic material, such as $Al_2O_3$, SiC, and $Si_3N_4$.

The metal wires are desired to be alumel and chromel wires. Furthermore the wires may be a combination of copper and constantan or platium and rhodium-platinum.

The above-mentioned contact member may be an alumel wire on which a metal of the same composition as a chromel wire has been vacuum-deposited, or vice versa.

It is preferable for the contact terminals that their surfaces are plated with silver or gold.

It is preferable for the contact holders to be molded with ceramic, such as $Al_2O_3$, SiC and $Si_3N_4$.

The movable thermocouple in the above-mentioned configuration follows the welding travel of the means of high-density energy irradiation, and enables correct measurement of the area directly.

The wires in the above-mentioned configuration enable the build-up welding in which heat resistant alloying elements are added homogeneousely at the desired concentration.

The method and configuration as described above can form a heat-resistant alloy layer of no welding defect without prior cutting and machining, and furthermore can control the quantity of alloy deposit as desired, achieving noticeable improvement of the heat resistance for surface modification of the metal part.

Furthermore the configuration equipped with temperature sensing means can make correct temperature measurement of the melted area, thus enabling the quality improvement of the heat-resistant alloy layer under the appropriate welding condition.

In addition, the configuration provided with the wires as described above can increase the concentration of heat-resistant alloying elements and also prevent weld cracks.

DESCRIPTION OF THE PREFERRED EMBODIMENT

Referring to the attached drawings, embodiments of the present invention are described below. First, an embodiment of the apparatus of this invention for modifying surfaces of metal parts will be described.

Figure 1:
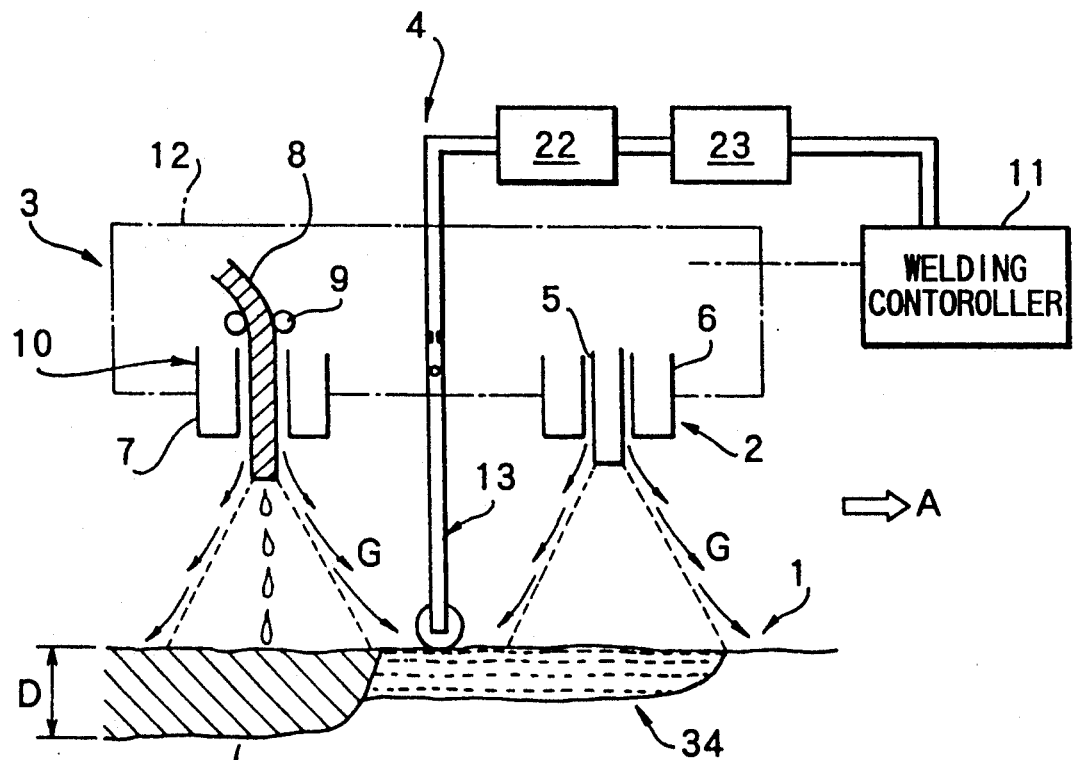
FIG. 1 is a side view of an apparatus suitable for carrying out an embodiment of the present invention for modifying surfaces of metal parts.

As shown in FIG. 1, the apparatus for metal surface modification comprises a TIG arc welding torch 2 which is a means of high-density irradiation to melt the area 1 as an objective of the surface modification of a metal part such as an aluminum casting, a MIG welding machine 3 for build-up welding of the melted area, and temperature sensing means 4 for sensing the temperature of the method area.

The TIG arc welding torch 2 is composed of an electrode (tungsten rod) 5 for generating arcs, and a nozzle 6 which surrounds the electrode and spouts an inert gas G, melting (remelting) the area 1, shielded with the inert gas G.

The MIG welding machine 3 is equipped with a MIG welding torch 10 which comprises a nozzle 7 to belch out the inert gas 7 and a wire feeder 9 to feed a wire 8 for welding, so as to carry out the build-up welding by using the wire 8 as a consumable electrode. In this embodiment a hollow wire in which composite powder described hereinafter is contained is used as the wire 8.

In addition the MIG welding machine 3 is provided with a welding controller 11 for adjusting the welding (traveling) speed, wire feed rate, welding voltage and current, etc. to carry out appropriately the build-up welding under the predetermined condition.

The welding torches 2 and 10 are arranged with a predetermined space between them in the electrode unit 12, which travels in the welding direction A. The TIG welding torch 2 is arranged to front the welding direction A. That is, the area 1 is subject to the build-up welding by the MIG welding machine 3 immediately after being melted by the TIG arc.

Furthermore, as temperature sensing means 4, a movable thermocouple 13 is arranged between both torches, 2 and 10.

Figure 2:
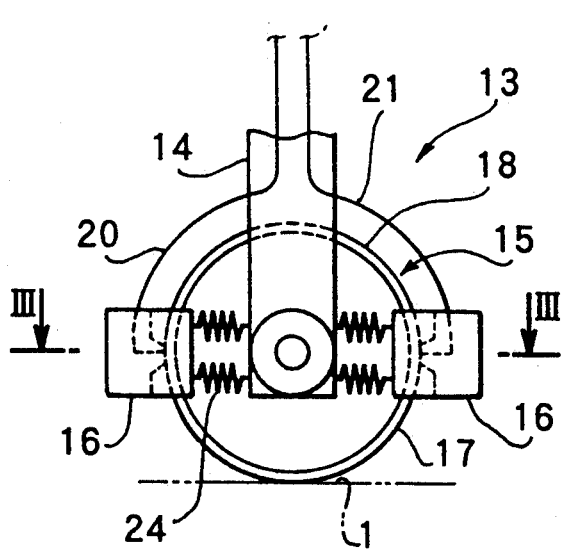
FIG. 2 is a side view showing a main part of the temperature sensing means of thereof.
Figure 3:
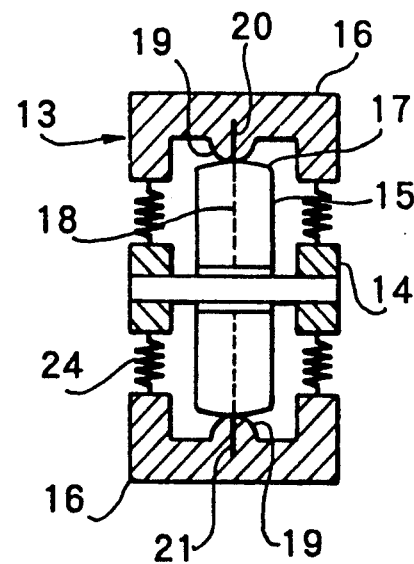
FIG. 3 is a cross-sectional view taken in the direction of the arrows along the line III—III of FIG. 2.
Figure 4:
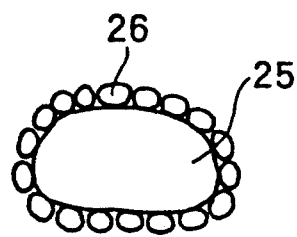
FIG. 4 is a cross-sectional view illustrating the process of manufacturing small capsules for explaining the wire in FIG. 1.

As shown in FIGS. 2 and 3, the movable thermocouple 13 comprises a rod 14 which has a predetermined length and is suspended from the electrode unit 12, a roller 15 pivoted at the tip of the rod to turn freely, and contact holders 16 provided on both sides in the diametrical direction to sandwich the roller 15.

The circumferential surface 17 of the roller 15 is formed in arc shape so that the roller can roll when it moves relatively in contact with the target area 1. At the middle in the width direction of the circumferential surface 17 a contact member of wire shape 18 is wound. On the other hand the contact holders 16 are formed in the a U-shape to hold the circumference of the roller 15 in the vertical direction, and have a projecting contact terminal 19, respectively, at the center facing just to the circumferential surface 17. In the contact terminals 19, the tips of alumel wire 20 and chromel wire 21, the couple of which generates a thermoelectromotive force, are buried. That is, both wires 20 and 21 are connected mutually through a contact member 18.

The other ends of metal wires 20 and 21 are connected, as shown in FIG. 1, to an instrument 22 for thermoelectromotive force measurements, and the thermoelectromotive force is sent to the welding controller 11 as temperature data (sensed values) via an amplifier 23.

Furthermore, as shown in FIGS. 2 and 3, a tension spring is fitted between the tip of the rod 14 and the contact holder 16, securing the contact between the contact terminal 19 and the circumferential surface 17 of the roller, i.e., the contact of the tips of the metal wires 20 and 21 with the contact member 18.

The configuration of the wire 8 in this embodiment is described below together with the manufacturing method of the wire.

Figure 5:
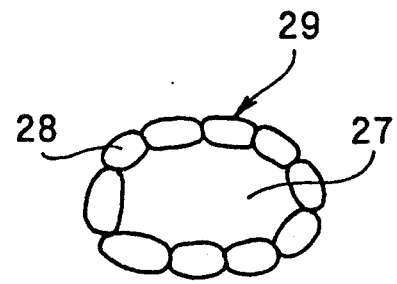
FIG. 5 is a cross sectional view of manufactured small capsules.

To manufacture the wire 8, first, to a particle 25 of Cr, a heat-resistant element, aluminum particles having the particle size of one-tenth that of the Cr particle are stuck to the Cr particle by the well known Van der Waals force. The Cr particle 25 surrounded with aluminum particles 26 is charged into a vessel equipped with blades revolving at a speed of 8,000–16,000 rpm (centrifugal rolling apparatus, not shown in the drawings), and given an impact force by air stream for 1 to 10 min. This impact force effects firm adhesion of the sticking aluminum particles 26 on the Cr particle 25, thus producing, as shown in FIG. 5, a small capsule 29 in which the nucleus Cr paricle 27 is coated with coating particles of Al 28.

Figure 6:
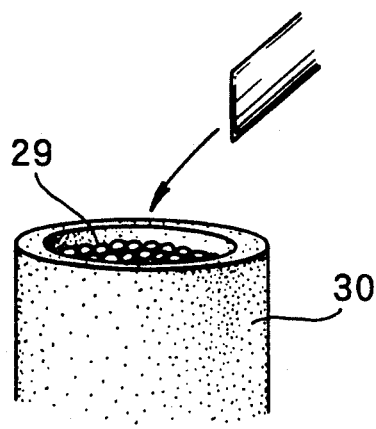
FIG. 6 is a perspective view illustrating a wire manufacturing process.
Figure 7:
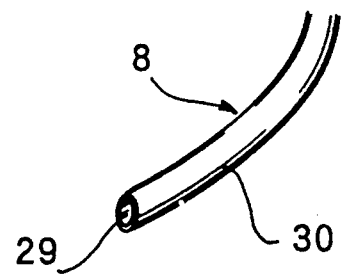
FIG. 7 is a perspective view illustrating a manufactured wire.

As shown in FIG. 6, a pipe 30 which is produced from elongated aluminum and serves as a sheath is filled with small capsules 29 which were manufactured as above and form composite powder. This pipe is drawn into a wire 8 of 0.8–1.6 mm in diameter as shown in FIG. 7. This drawing may be carried out by the same process as a known process for production of flux-cored wires.

Next, an embodiment of the method of the present invention for modifying surfaces of metal parts is described below as an effect of the above-mentioned configuration.

When the surface modifying apparatus is used to modify a relevant area 1 of a cylinder head 31, an aluminum casting, i.e. the area between the suction port 32 and the exhaust port 33, the electrode unit 12 is moved from one edge a of the area 1 to the other end b.

Figure 9:
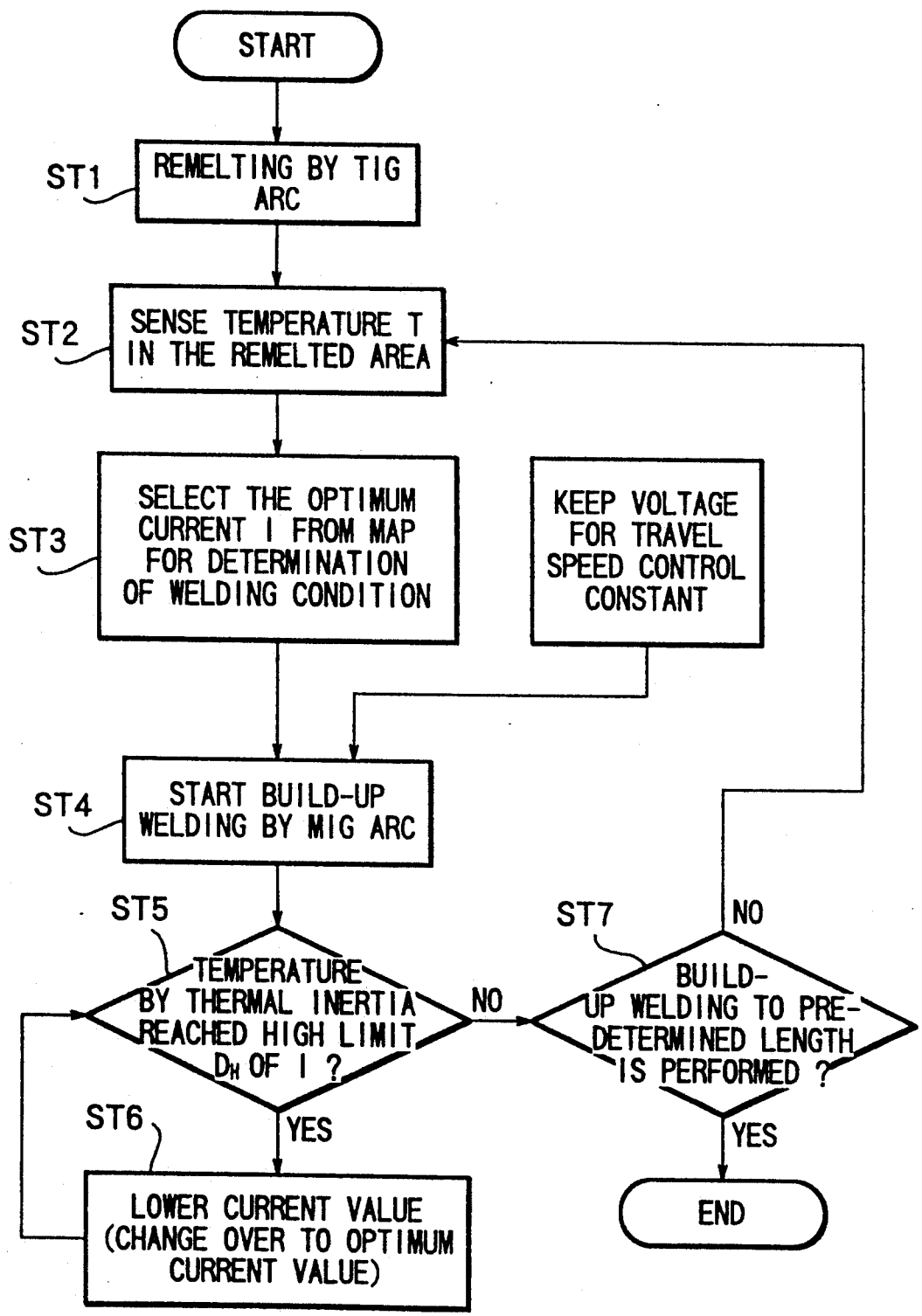
FIG. 9 is a flow diagram showing an embodiment of the method of modifying surfaces of metal parts of the present invention.

That is, as shown in FIG. 9, the area 1 is first melted by the arc of the TIG arc welding (Step 1). In other words a remelting layer 34 as shown in FIG. 1 is formed.

The surfaces of the cyclinder head 31 have been coated with the oxide ($Al_2O_3$) which will prevent smooth MIG welding. By the TIG arc prior to the MIG welding, however, such unpreferable oxide coating is destroyed and a new layer emerges on the cast surface, enabling the build-up MIG welding. Furthermore the heating by the TIG arc melts the base metal and as a result, elutes gas from minute pores (porosity defects) in the base metal, which will result in blow holes, thus forming the fine and dense metallurgical structure.

Then the temperature T by thermal inertia of the formed remelting layer 34 for the MIG welding is determined by bringing the roller 15 of a movable thermocouple 13 into contact with the remelting layer 34 (Step 2).

Figure 10:
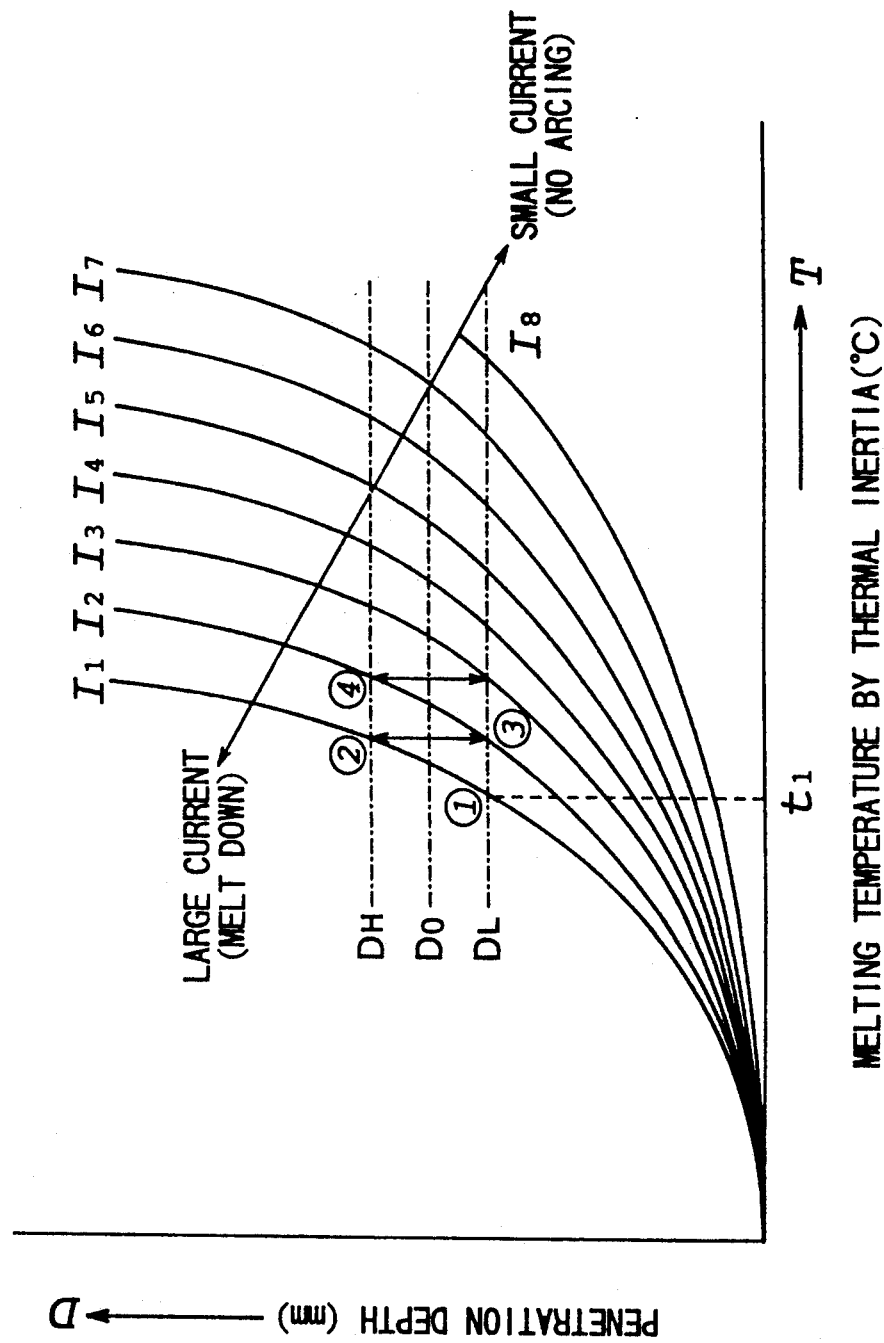
FIG. 10 is a map of welding conditions for explaining the process of determining the welding condition.

The thermoelectromotive force of the sensed temperature t is sent to the welding controller 11 to determine the optimum condition for the MIG welding. The welding controller 11 beforehand has stored control data to perform control according to the welding condition map as shown in FIG. 10 of this embodiment.

The welding condition map portrays the relationship between the melting temperature T by thermal inertia and the penetration depth D at different current values I when the wire feed rate, electrode travel speed and inter-electrode distance (distance from the electrode to the melting area) are constant. The penetration depth D increases with rise of the melting temperature T by thermal inertia, and also increases with increase of the current I. If the melting temperature by thermal inertia is known, therefore, a desired penetration depth will be secured by selecting an appropraite value of the current I. In this embodiment the high limit $D_H$ and low limit $D_L$ of the penetration depth were set up around the optimum penetration depth $D_o$ so that the penetration depth comes into the optimum range ($D_H$-$D_L$) if any current value is selected in the range of $I_1$ to $I_8$ in which the build-up welding (capable of producing arcs without melt-down) can be performed at a certain melting temperature by thermal inertia t.

Receiving the information on the melting temperature by thermal inertia, the welding controller 11 selects the most appropriate value of the current I which is in the optimum range shown in the welding condition map to determine the welding condition of the MIG welding machine 3 (Step 3). For instance, if in FIG. 10 the sensed melting temperature by thermal inertia is $t_1$, the corresponding current $I_1$ is selected.

The MIG welding machine carries out the build-up welding of the remelting layer 34 under the condition determined by the welding condition (Step 4). That is, as illustrated in FIG. 1, a heat-resistant alloy layer 35 is formed in the area 1 heated by thermal inertia by arc welding using a wire 8 filled with small capsules 29.

With the progress of the remelting and build-up welding the movable thermocouple 13 sends continuously the sensed temperature data on the remelting layer 34 to the welding controller 11. The welding controller 11 compares the sensed temperature t with the current value $I_1$ selected as the welding condition, and when the melting temperature by thermal inertia T reaches the high limit $D_H$ (Step 5), the welding controller 11 lowers the current I of the MIG welding torch 10 (Step 6), that is, switches the current I from the initial current $I_1$ to a lower current value $I_2$.

When the melting temperature by thermal inertia by TIG arc gradually increases, the optimum current value in FIG. 9 is sequentially changed over in the order of $I_1$, $I_2$, $I_3$ . . . , and at the same time the intersection with the line of melting temperature by thermal inertia shifts in the order of 1, 2, 3, 4 . . . .

After the electrode unit 12 arrives at the end(b) of the target area 1, the TIG arc is discontinued and subsequently the MIG arc, ending the modification (Step 7).

If at a start point a the remelting and build-up welding are started under control of the melting point by thermal inertia, heating for thermal inertia is started at a place c on the opposite side to the advancing direction of the start point a.

The serial setup of the TIG arc welding torch 2 and the MIG welding machine 3 as described above to perform the build-up welding by the MIG welding after remelting of the surface of the target area 1 enable effective use of advantages of the MIG welding without machining as well as elusion of gas in the process of remelting for preventing occurrence of blow holes due to porocity defects, thus forming a heat-resistant alloy layer 35 without weld defects.

Furthermore the effect of the thermal inertia of the TIG arc improves the degree of fusion of the base metal (aluminum) and the wire 8, prevents weld cracks and deepens the penetration.

As compared with the case of conventional arc welding only, therefore, the present invention enables good build-up welding. When alloying a base metal or adding a heat-resistant metal to a base metal, it will be generally key points as to how sufficiently the welding can be carried out (appearance of beads), how good the quality of the build-up part (occurrence of such defects as blow holes), and how wide range the build-up welding can cover (depth and width of penetration . . . quantity of deposit). The present invention is superior in all points to single (TIG arc or MIG) build-up welding, and furthermore can achieve practical low-cost and high-productivity alloying and addition of heat-resistant elements.

In the present invention the temperature of the remelting layer 34 is sensed by a movable thermocouple 13, and on the basis of the sensed temperature t welding conditions of the MIG welding machine 3 are determined. As a result, the melting temperature T by thermal inertia can be correctly grasped at the real time and a heat-resistant alloy layer 35 of desired deposit quantity is formed. If the welding operation is controlled by the initial temperature of the remelted area, the temperature will rise progressively by the welding, and a large difference between the initial and final depths of penetration will be caused. In the present invention the MIG welding conditions are changed in response to the changing melting temperature T by thermal inertia, obtaining always the heat-resistant alloy layer 35 of the desired penetration depth The movable thermocouple 13 of the present invention is kept in direct contact with the remelting layer 34 and the roller 15 is the part of substantial contact with the layer 34 and can therefore follow up to the TIG arc welding torch 2 with a predetermined distance from the torch 2, thus securing correct sensing of the melting temperature.

In this embodiment the welding current was controlled according to the beforehand prepared welding condition map. However, it may be controlled by any method provided the control relates to the current.

Figure 8:
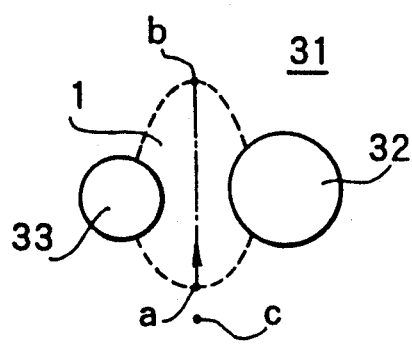
FIG. 8 is a bottom plan view of a cylinder head showing an area subjected to modification in FIG. 1.

In FIG. 8 the information of the sensed temperature is sent to the MIG welding machine 3. However, it may be fed back to the arc control for the TIG arc welding. In the latter case the depth of the remelting layer 34 (the melting temperature by thermal inertia T) is kept stable, and the quality of the heat-resistant alloy layer 35 is improved, and for such purpose a separate temperature sensing device (movable thermocouple) may be provided in position prior to the TIG arc welding torch and near to the torch.

Furthermore this embodiment is intended to carry out the build-up welding with a wire 8 which is filled with small capsules 29 containing Cr as nuclei. This wire structure can prevent weld cracks.

That is, Cr in the heat-resistant layer 35 is homogeneously dispersed and distributed as fine particles in aluminum matrices which secure compatibility with aluminum alloy castings. This compatibility can eliminate the cause of weld cracks which will take place at the time of build-up with heat-resistant metals.

Therefore the traditional remelt alloy processing of surfaces involved the problem that wide improvement of the heat resistance of metal surfaces could be achieved because of limitation of the concentration for preventing defects in the processing or cracks after the processing. This embodiment can widely reduce the limitation to the concentration of heat-resistant alloy and allow addition of heat-resistant alloying elements at any necessary concentration by changing the particle size of heat-resistant alloying elements 25 (the ratio to the size of aluminum particles 26) in capsules 29.

Furthermore, the use of the wire 8 makes the electric resistance in the build-up welding uniform. In general, when producing a mixture of aluminum particles with particles of a heat-resistant alloying element, it is difficult to mix both kinds of particles homogenously, and therefore the heterogeneous mixture of particles results in variation of electric resistance in the lengthwise direction of the wire, making stable build-up very difficult. This embodiment prevents such possible difficulty from arising.

As the nucleus (heat-resistant alloying element) of the capsules 29, in addition to Cr, other heat-resistant metals (Co, Mo, etc.) or ceramic particles such as $Al_2O_3$, SiC, $Si_3N_4$, or CuO may be used. As materials for coating particles and sheath, metals (Cu etc.) which have compatibility with aluminum may be used.

The cross-sectional shape of the wire is not limited to that shown in FIG. 7, but may be of any shape if it can be filled with small particles of capsules. For example, different shapes of wires which have been supplied as flux-cored wires may be used as the wire of the present invention.

In place of the TIG arc used as the high-density energy prior to the MIG welding in this embodiment the plasma arc may be also used.

It is further preferable that the contact member 18 shown in FIGS. 2 and 3 is of smaller diameter from the standpoint of better response of the thermocouple. Furthermore the contact member 18 should be produced, for example, by vacuum deposition of a metal having the same composition as that of chromel on to the surface of an alumel wire, or vice versa.

The roller 15 is required to be made of a material of high thermal and electric insulation in addition to high electric resistance. In consideration of these requirements it is preferable to produce the roller 15 from ceramics such as $Al_2O_3$, $Si_3N_4$ and SiC. However, it is also possible to make only the circumferential surface layer 17 out of a ceramic and the body of the roller 15 out of a metal.

The contact terminal 19 form a junction of the thermocouple and, at the same time, are in contact with metal wires 20 and 21 and the contact member 18. To secure durability, it is preferable to plate the contact surfaces of the contact terminals 19 with silver or gold.

The contact holder 16 require such high thermal resistance and electric resistance as those of the roller 15, and desired to be made up of a ceramic material.

This embodiment used alumel-chromel wires as a thermocouple. Other types of thermocouple, such as copper-constantan, and platinum-platinum rhodium, may be selected depending on the temperature meplurement range.

This embodiment adopted, as the most preferable type of the temperature sensing device, the movable thermocouple 13. A thermocouple can be fixed at a place near the area 1 to be alloyed: In this case the actual melting temperature is estimated on the basis of the predetermined relationship between the sensed temperature and the temperature of the remelting layer. Furthermore contactless measurements of the melting temperature by using a radiation thermometer may be used by correcting beforehand its reflectance although in the temperature measurements on aluminum parts the accuracy will be somewhat sacrificed because the temperature correction is liable to lead to larger values than the actual temperatures.

We claim:

1. An apparatus for modifying surfaces of metal parts, comprising:
   (a) high-density energy irradiation means for melting the area to be modified;
   (b) a MIG welding machine for build-up welding of the melted area by using a wire containing heat-resistant element; and
   (c) temperature sensing means for sensing the temperature of said melted area to determine the welding condition of said MIG welding machine, said temperature sensing means including a thermocouple which is in contact with said melted area and generates a thermoelectromotive force corresponding to the temperature of said melted area and an instrument for measuring the thermoelectromotive force which sends the thermoelectromotive force as information of the melting temperature by thermal inertia to a welding controller via an amplifier connected to said thermocouple,
   said thermocouple including a roller which rolls on said melted area and on the circumferential surface on which a contact member is wound, a couple of metal wires which generate a thermoelectromotive force, and contact holders provided to hold said roller in diametric opposition to said contact holders so that said metal wires confront each other via said contact member.

2. An apparatus for modifying surfaces of metal parts as claimed in claim 1 in which said MIG welding machine is positioned at a place on the opposite side of the advancing direction A of said high-density energy irradiation means at a predetermined distance.

3. An apparatus for modifying surfaces of metal parts as claimed in claim 1 in which said high-density energy irradiation means is a TIG arc welding torch which irradiates TIG arcs.

4. An apparatus for modifying surfaces of metal parts as claimed in claim 1 in which said roller is pivoted at the tip of a rod positioned vertically on the opposite side to the advancing direction of said energy irradiation means.

5. An apparatus for modifying surfaces of metal parts as claimed in claim 1 in which said contact holders have a contact terminal in which the tip of either of said metal wires is embedded.

6. An apparatus for modifying surfaces of metal parts as claimed in claim 5 in which said contact holders has tension springs for securing contact of said contact terminals with the circumferential surface of said roller.

7. An apparatus for modifying surfaces of metal parts as claimed in claim 5, in which the surfaces of said contact terminals are plated with silver or gold.

8. An apparatus for modifying surfaces of metal parts as claimed in claim 1 in which said wire comprises small capsules produced by coating nuclei of a heat-resistant alloying element with metal particles and a sheath in which the capsules are filled.

9. An apparatus for modifying surfaces of metal parts as claimed in claim 8 in which said metal particles are composed of a metal having compatibility with the metal of the area to be modified.

10. An apparatus for modifying surfaces of metal parts as claimed in claim 8, in which said sheath is composed of a metal having compatibility with the metal of the area (1) to be modified.

11. An apparatus for modifying surfaces of metal parts as claimed in claim 8, in which said heat-resistant element is in the form of particles of heat-resistant metals, such as Cr, Co, and Mo, or of ceramics, such as $Al_2O_3$, SiC, $Si_3N_4$, and CuO.

12. An apparatus for modifying surfaces of metal parts as claimed in claim 1, in which at least the circumferential surface of said roller is formed of a ceramic material such as $Al_2O_3$, SiC, and $Si_3N_4$.

13. An apparatus for modifying surfaces of metal parts as claimed in claim 1, in which said metal wires are an alumel wire and a chromel wire.

14. An apparatus for modifying surfaces of metal parts as claimed in claim 1, in which said metal wires are of a combination of copper with constantan or of platinum with platinum-rhodium.

15. An apparatus for modifying surfaces of metal parts as claimed in claim 4, in which said contact member is an alumel wire on which a metal of the same composition as that of chromel is vacuum deposited or a chromel wire on which a metal of the same composition as that of alumel is vacuum deposited.

16. An apparatus for modifying surfaces of metal parts as claimed in claim 1, in which said contact holders are composed of a ceramic material, such as $Al_2O_3$, SiC, and $Si_3N_4$.

* * * * *